United States Patent
Provost et al.

(10) Patent No.: US 10,633,836 B2
(45) Date of Patent: Apr. 28, 2020

(54) ATMOSPHERIC WATER GENERATION APPARATUS

(71) Applicants: Wayne A. Provost, St. George, UT (US); Jeffrey Stewart, Washington, UT (US)

(72) Inventors: Wayne A. Provost, St. George, UT (US); Jeffrey Stewart, Washington, UT (US)

( * ) Notice: Subject to any disclaimer, the term of this patent is extended or adjusted under 35 U.S.C. 154(b) by 0 days.

(21) Appl. No.: 16/541,002

(22) Filed: Aug. 14, 2019

(65) Prior Publication Data

US 2020/0056356 A1 Feb. 20, 2020

Related U.S. Application Data

(60) Provisional application No. 62/718,502, filed on Aug. 14, 2018.

(51) Int. Cl.
| | | |
|---|---|---|
| *B01D 53/02* | (2006.01) | |
| *E03B 3/28* | (2006.01) | |
| *B01D 5/00* | (2006.01) | |

(52) U.S. Cl.
CPC ............. *E03B 3/28* (2013.01); *B01D 5/0006* (2013.01); *B01D 5/009* (2013.01); *B01D 5/0072* (2013.01)

(58) Field of Classification Search
CPC ....... E03B 3/28; B01D 5/0006; B01D 5/0072; B01D 5/009
See application file for complete search history.

(56) References Cited

U.S. PATENT DOCUMENTS

| | | | |
|---|---|---|---|
| 3,498,077 A * | 3/1970 | Worzel ................ | B01D 5/0006 62/260 |
| 6,574,979 B2 * | 6/2003 | Faqih .................. | B01D 5/0006 62/285 |
| 7,000,410 B2 | 2/2006 | Hutchinson | |
| 9,227,149 B2 * | 1/2016 | Boudeman ............... | E03B 3/28 |
| 2006/0065001 A1 * | 3/2006 | Bernardo Castanon Seoane ........ | B01D 5/0051 62/291 |
| 2006/0207278 A1 * | 9/2006 | Mead .................... | A47F 3/0408 62/246 |
| 2007/0151262 A1 * | 7/2007 | Bailey ................. | B01D 5/0009 62/93 |
| 2014/0053580 A1 * | 2/2014 | Ferreira .................. | C02F 1/18 62/80 |
| 2014/0116870 A1 | 5/2014 | Kamen et al. | |
| 2017/0307251 A1 | 10/2017 | Baruch | |
| 2018/0126325 A1 | 5/2018 | Sher | |

FOREIGN PATENT DOCUMENTS

WO 2016033544 3/2016

* cited by examiner

*Primary Examiner* — Christopher P Jones
(74) *Attorney, Agent, or Firm* — Gurr Brande & Spendlove, PLLC; Robert A. Gurr

(57) ABSTRACT

An atmospheric water generation apparatus has an intake fan, a water mister, a cooling or evaporative coil, a water reservoir, a water pump, and a water valve. A method of generating water from the atmosphere involves inducing air into a chamber, misting the air with water while the air passes a cooling or evaporative coil, and collecting the resulting water therefrom.

10 Claims, 5 Drawing Sheets

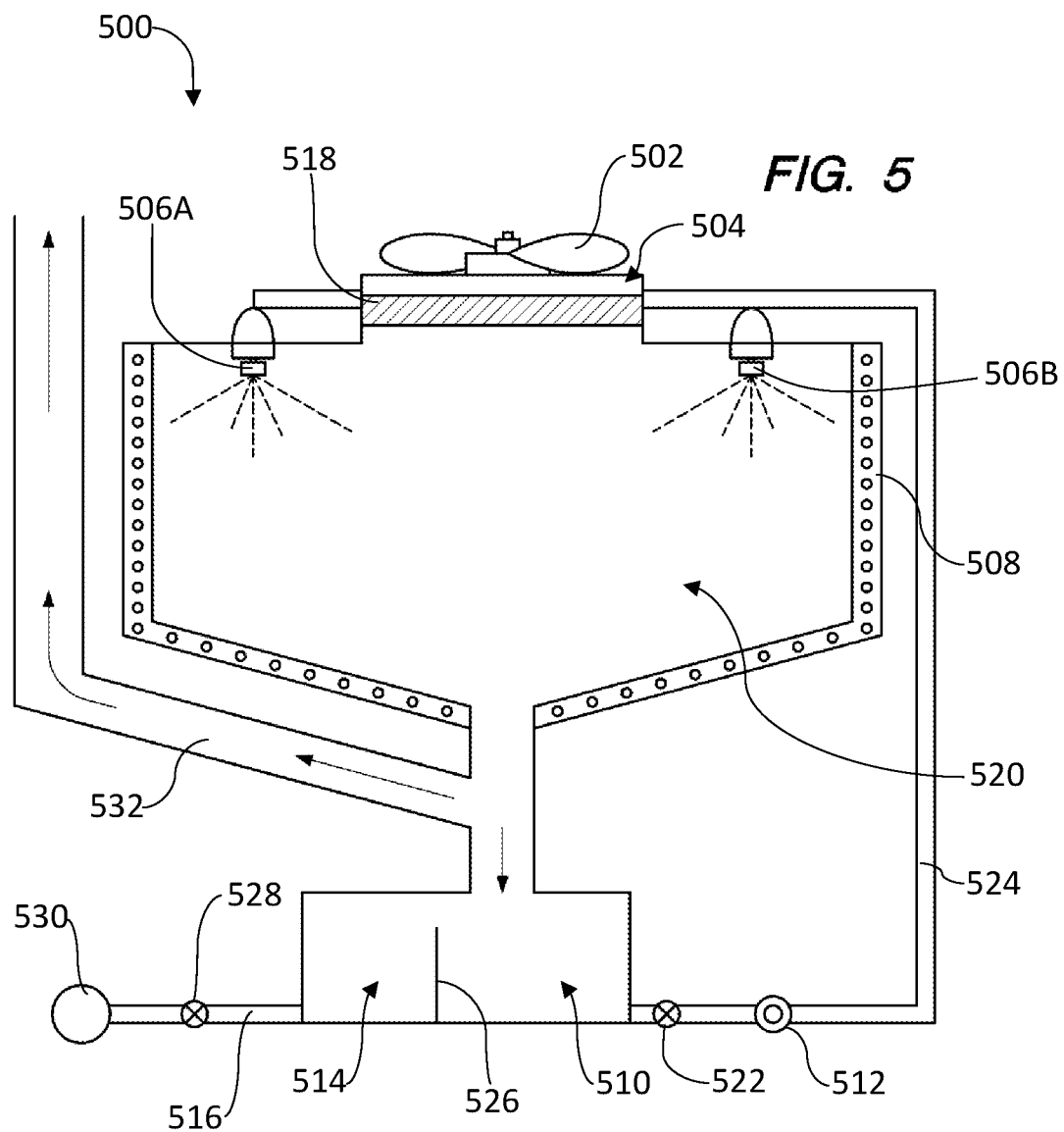

ATMOSPHERIC WATER GENERATION APPARATUS

CROSS-REFERENCE TO RELATED APPLICATIONS

This application claims the benefit of U.S. Provisional Application Ser. No. 62/718,502, filed on Aug. 14, 2018, which is incorporated herein by reference.

TECHNICAL FIELD

The present disclosure relates to atmospheric water generation. More particularly, the present disclosure relates to an apparatus for condensing humidity in the air and containing the resulting water.

BACKGROUND

Dehumidifiers are used for a variety of reasons, including comfort, to eliminate odors, or to prevent the growth of mildew. Large applications include use of dehumidifiers for use with indoor swimming pools and ice rinks. The dehumidifier intakes air and removes the moisture by passing it through the evaporator where it is cooled and dehumidified. However, these systems simply contemplate the removal of humidity from the air so that it can be disposed of elsewhere, such as outside of the building. The water collected by standard dehumidifiers is a type of greywater, which is generally not acceptable for drinking or using on garden vegetables.

Another type of dehumidifier—which is food grade—is generally referred to as an atmospheric water generator. These machines are designed to avoid toxic metal contamination and are designed to generate potable water. These machines generally operate on similar principles: air is passed over a cooled coil, causing humidity to condense into droplets. The rate of water production depends on the ambient temperature, humidity, the volume of air passing over the coil, and the machine's capacity to cool the coil. In some water generators, a compressor circulates refrigerant through both a condenser and an evaporator coil, which cools the air surrounding it. This lowers the air temperature to its dew point, causing water to condense. Other technologies utilize wet desiccants such as lithium chloride, lithium bromide, or a brine solution to extract water from the air.

Another apparatus, commonly referred to as an "air washer," introduces a spray or mist of water, or a wick filter, as air enters the unit. Because the sprayed water is below the dew point temperature, the humidity in the air condenses, generating water. These systems are typically used to help purify air and add humidity back into the air, hence the air "washer" name.

Due to the lack of accessible potable water in many areas of the world, there is a need for a more efficient means for generating water from the surrounding air. While several dehumidifiers, air washers, and water generators exist in the art, they fail to generate sufficient potable water. Accordingly, there is a need for an apparatus that can generate potable water in sufficient quantities from the atmosphere. The present invention seeks to solve these and other problems.

SUMMARY OF EXAMPLE EMBODIMENTS

In one embodiment, an atmospheric water generation apparatus comprises an intake fan, a water mister, a cooling or evaporative coil, a water reservoir, a water pump, and a water valve.

In one embodiment, exhausted air is directed to the air intake fan for recirculating through the apparatus.

A method of generating water from the atmosphere comprises inducing air into a chamber, misting the air with water while either 1) separately passing the air over a cooling or evaporative cooler or, 2) simultaneously passing the air over a cooling or evaporative cooler, and then collecting the resulting water therefrom.

BRIEF DESCRIPTION OF THE DRAWINGS

FIG. 3A is a top view of a panel separating a fan from an evaporative coil in an atmospheric water generator;
FIG. 5 is a diagram of an atmospheric water generator.

DETAILED DESCRIPTION OF EXAMPLE EMBODIMENTS

Figure 1:
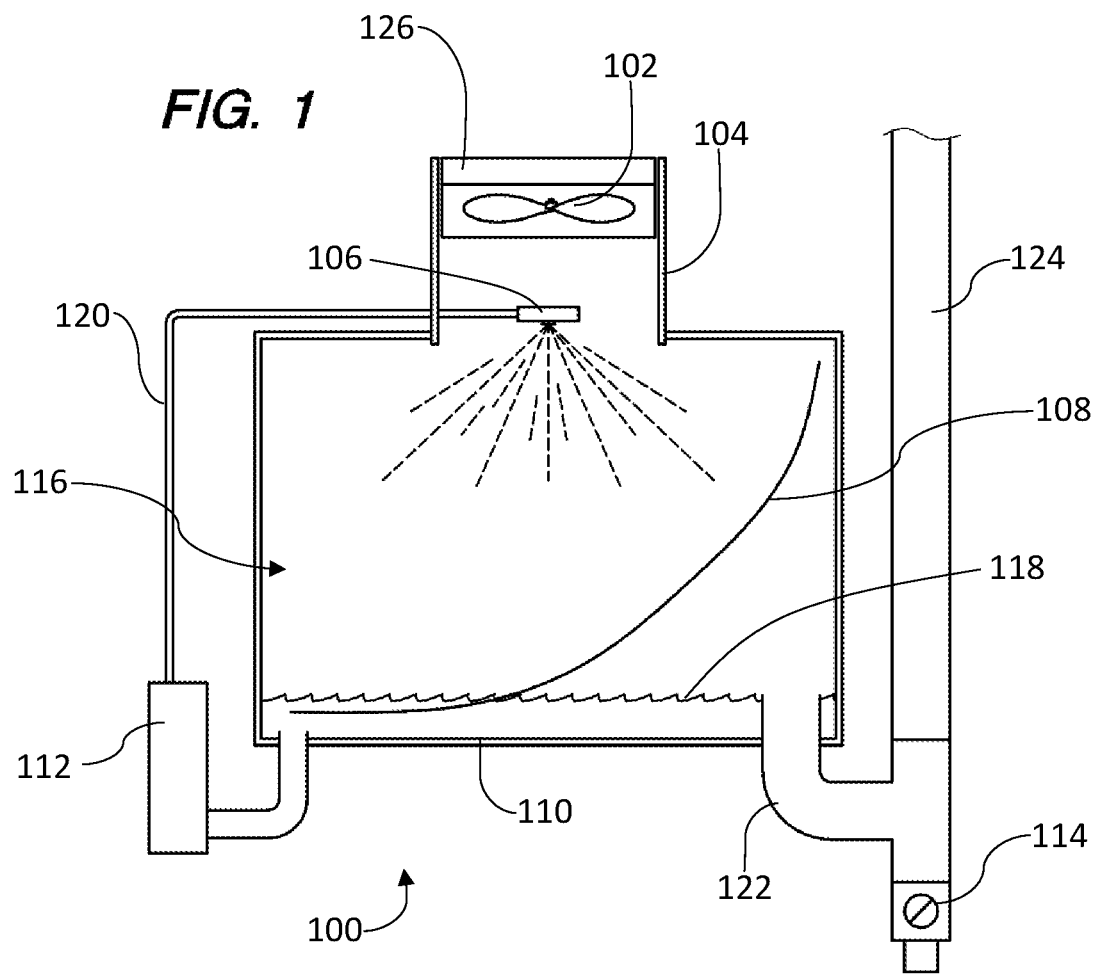
FIG. 1 is a diagram of an atmospheric water generator.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As discussed earlier, there is a need for a water generator that is capable of producing significant potable water using the surrounding atmosphere. The atmospheric water generation apparatus disclosed herein solves these and other problems.

Referring to FIG. 1, in one embodiment, an atmospheric water generation apparatus 100 comprises an intake fan 102 situated in a housing intake 104, a water mister 106, a cooling or evaporative coil 108, a water reservoir 110, a water pump 112, and a water valve 114. As shown, the fan 102 pulls air from the atmosphere into the housing intake 104. The air then enters chamber 116, where it passes over water mister 106. Due to the combination of the mister 106 and the cooling coil 108, the moisture in the passing air reaches its dew point faster, removing the moisture from the air and creating water 118. The water then collects within chamber 116, where it can be used as the supply source to the water mister 106 using pump 112 and pump line 120. Further, as the water 118 collects, it passes into the outlet pipe 122, where it can be released for use via valve 114. In addition, air is exhausted via air outlet 124. Accordingly, due to the combination of the water mister 106 and cooling coil 108, the atmospheric water generation apparatus 100 generates water more efficiently than the prior art. Further, to aid in keeping the air and water clean, a filter 126 may be added to the housing intake 104. While the water mister 106 may be supplied with water that is in the chamber 116 using pump 112, allowing the unit to be self-contained, such is not required. In other words, water to the water mister 106 may be supplied using an outside source, in which case the pump 112 is not required. In one embodiment, a combination of an outside water source and the pump 112 may be used. For example, when first starting the atmospheric water generation apparatus 100, water may be supplied to the mister 106 from an outside source. Upon reaching a predetermined threshold (which may be determined using a water sensor and a microcontroller), the outside water may be shutoff (such as using an electronically controlled valve) and the pump 112 may be started, allowing the atmospheric water generation apparatus 100 to recycle water.

Figure 2:
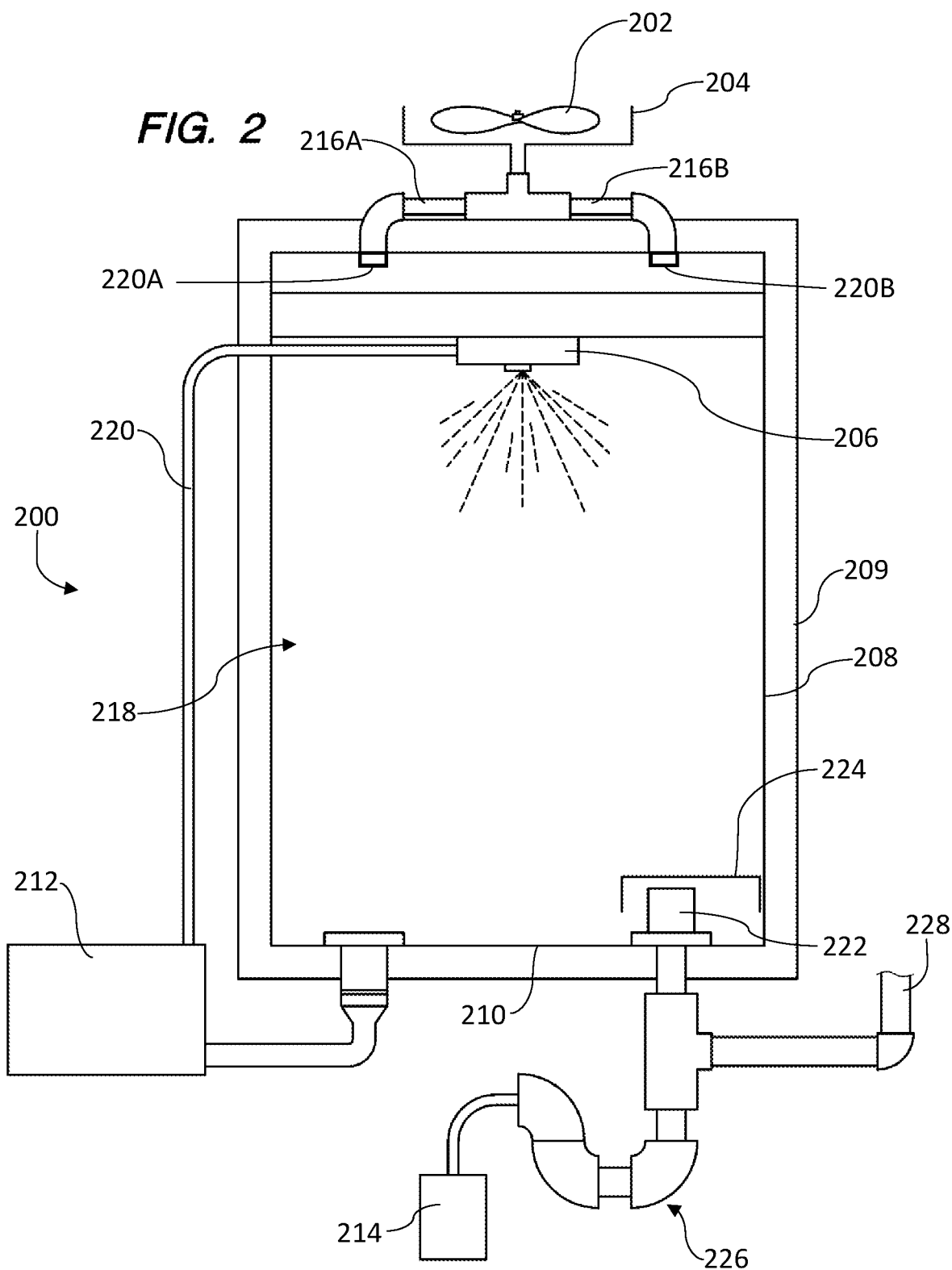
FIG. 2 is a diagram of an atmospheric water generator.

Referring to FIG. 2, in one embodiment, an atmospheric water generation apparatus 200 comprises an intake fan 202 situated in a housing intake 204, a water mister 206, a galvanized housing 208 insertable within a refrigeration unit 209 (e.g., refrigerator), a water reservoir 210, a water pump 212, and a water valve 214. As shown, the fan 202 pulls air into the housing intake 204, where it passes through one or more entry pipes 216A, 216B, the pipes 216A, 216B passing through the refrigeration unit 209. The air then enters the housing 208 and chamber 218 via inlets 220A, 220B, respectively. Because the galvanized housing 208 is within a refrigeration unit 209, the air gets cooled as it passes through the entry pipes 216A, 216B and enters into the cooled chamber 218. The cooled air then mixes with the mist produced by water mister 206, which causes the moisture in the cooled air to reach its dew point much faster than water machines in the art. As a result, water is extracted from the cooled air, where it then pools in reservoir 210 (bottom of chamber 218). The water may then be pumped through pump 212 and pump line 220 back to the mister 206, allowing the newly generated water to be continually used to generate additional water from incoming air. As the water level increases, it is able to pass into outlet pipe 222. In one embodiment, the outlet pipe 222 has a shield 224 that prevents water direct from the mister 206 from entering the outlet pipe 222. In one embodiment, a plumbing trap 226 may be used to prevent excess air pressure on the outlet valve 214, the air exhausting out of air exhaust port 228 instead. As shown, some components, such as the pump 212, may be outside of the refrigeration unit 209, although alternate embodiments would allow them to be inside as well.

Figure 3:
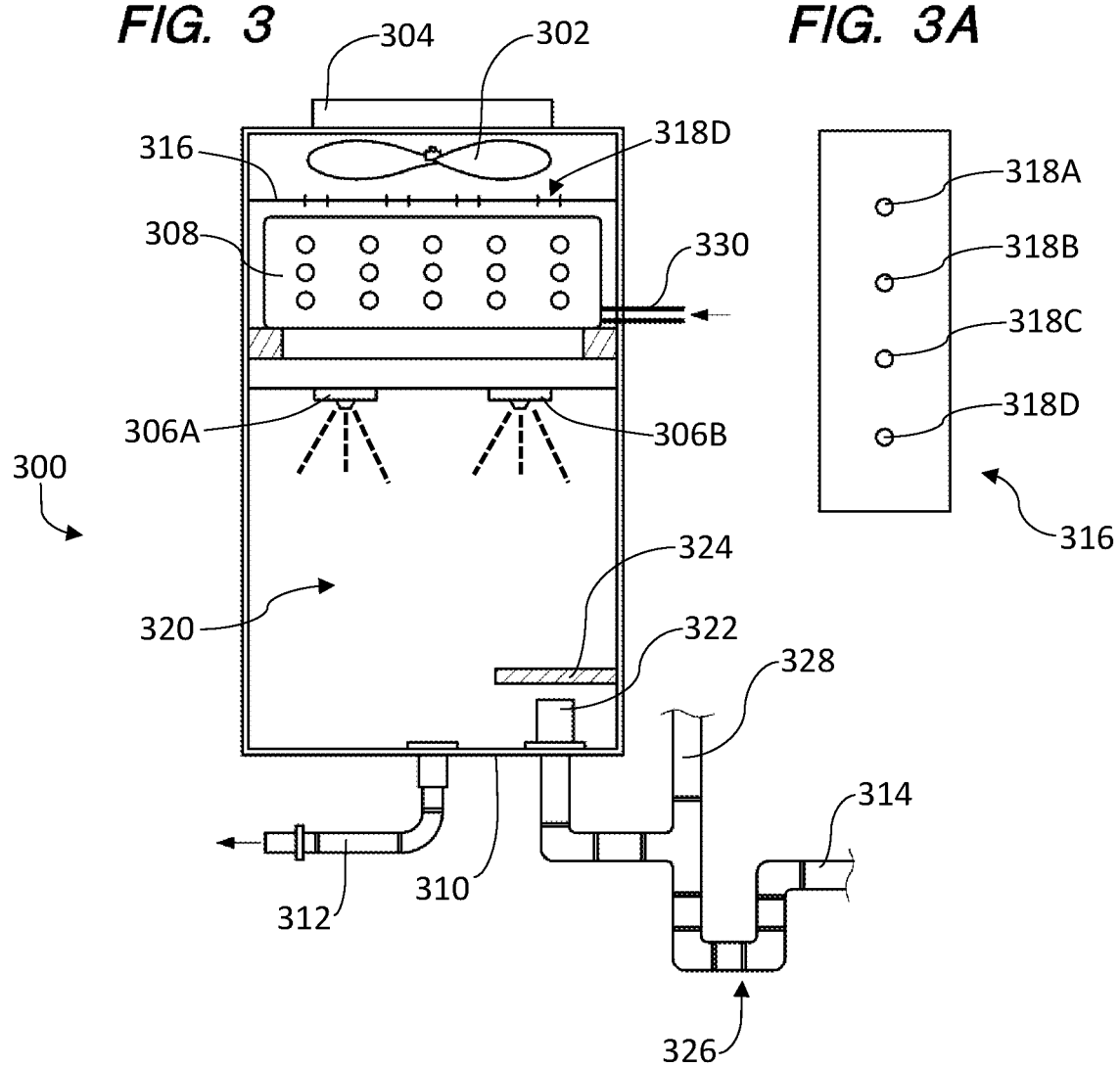
FIG. 3 is a diagram of an atmospheric water generator.

FIG. 3 illustrates an atmospheric water generation apparatus 300, in one embodiment, which comprises an intake fan 302 situated in a housing intake 304, at least one water mister 306A, 306B, an evaporating coil 308, a water reservoir 310, a water pump (not shown) coupled to pump outlet 312, and a water outlet 314. Air is pulled into the housing intake 304 via the intake fan 302. The air is then passed through a plate 316 that directs the air through apertures 318A-318D (best seen in FIG. 3A) where it is channeled over the evaporating coil 308, significantly cooling the air. The air then enters chamber 320 where it mixes with additional cold air and with the mist of misters 306A, 306B. As a result of the cool air mixing with the mist from misters 306A, 306B, the moisture in the air reaches its dew point rapidly (i.e., condenses), where the water then falls and collects as a reservoir 310. As the water level in the reservoir 310 increases, water then spills into outlet 322. The purpose in the outlet 322 being raised from the floor of the reservoir 310 is to allow water to be recycled to the misters 306A, 306B. Otherwise, the water could be fully drained from the reservoir 310, which would damage the pump that cycles water from the reservoir 310 to the misters 306A, 306B. Further, maintaining water in the reservoir 310 keeps the chamber 320 humid and colder. The outlet 322 may be covered using shield 324 so as to avoid mist from the misters 306A, 306B from directly entering the outlet 322. The outlet 322 may be coupled to a plumber trap 326 to aid in diverting air through air exhaust 328 and water to water outlet 314. The evaporating coil 308 may be of a type typical in the art of cooling, with its coolant being pumped through coolant inlet 330. It will be appreciated that any number of cooling coils or evaporating coils may be used without departing herefrom. It will further be appreciated that only one mister 306A is required, but that a plurality may be used. In addition, while the plate 316 is shown, and aids in air direction and pressure, the plate 316 is not required. Lastly, the atmospheric water generation apparatus 300 may further comprise an air filter and/or a water filter to ensure the water remains potable.

Figure 4:
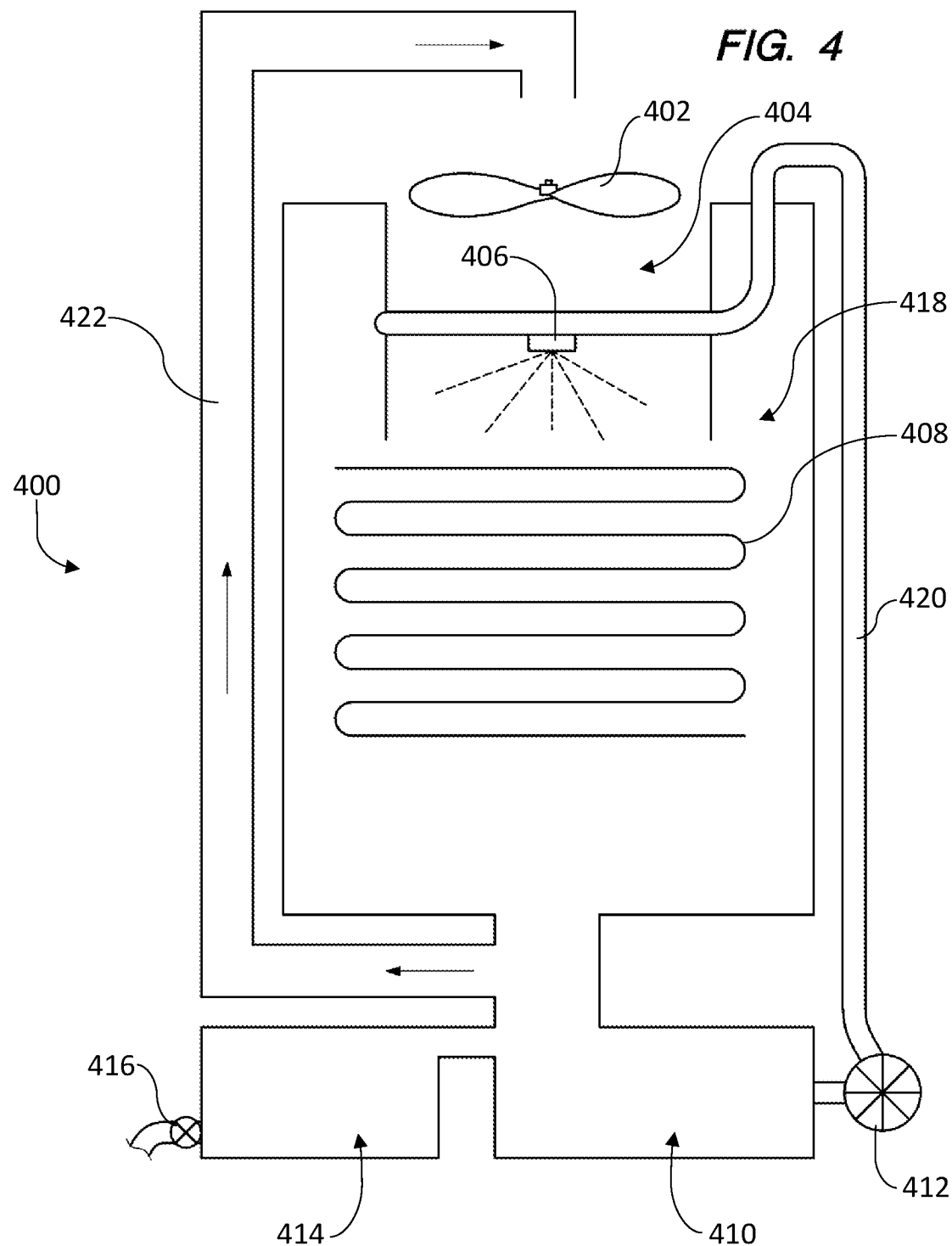
FIG. 4 is a diagram of an atmospheric water generator.

FIG. 4 illustrates, in one embodiment, an atmospheric water generation apparatus 400 comprising an intake fan 402 situated in, or adjacent to, a housing intake 404, at least one water mister 406, an evaporating coil 408, a water reservoir 410, a water pump 412 coupled to the water reservoir 410, a water collection tank 414, and a water outlet 416. Air is pulled into the housing intake 404 via the intake fan 402. The air then passes through the mist of mister 406 as it enters chamber 418. Because the chamber contains the evaporating coil 408, the temperature is colder, which reduces the temperature of the incoming air, condensing it. The resulting water then drops into the reservoir 410. The water may then be recycled to the water mister 406 from the reservoir 410 using pump 412 and pump line 420. When the water reaches a predetermined threshold, the water spills into a separate water collection tank 414. The water in the water collection tank 414 may then exit via outlet 416 (e.g., a valve) for use by a user. Further, once the air has entered and passed through the chamber 418, it may exit through air exhaust 422. As shown, the air exhaust 422 may be recycled to the housing intake 404, which may aid in keeping temperatures low and in ensuring the maximum amount of moisture is removed from the air. While the air may be recycled to the housing intake 404, it is not required and the air exhaust 422 may simply vent to the atmosphere. Again, having a water reservoir 410 separate from the water collection tank 414 ensures that the pump 412 will always have a supply of water.

Referring to FIG. 5, in one embodiment, an atmospheric water generation apparatus 500 comprises an intake fan 502 for inducing (e.g., pulling) air into a housing intake 504, at least one water mister 506A, 506B, insulated walls 508, a water reservoir 510, a water pump 512 coupled to the water reservoir 510, a water collection tank 514, and a water outlet 516. Air is pulled into the housing intake 504 via the intake fan 502. The air may pass through a filter 518 before entering chamber 520. The chamber 520 may be chilled using any number of refrigerating systems, which aids in condensing the air. The insulated walls 508 maintain the chamber in a cooled state. As the air enters cooled chamber 520, the air contacts misters 506A, 506B, causing the moisture in the air to accelerate condensing until the dew point is reached. Upon reaching its dew point, the water droplets fall into reservoir 510. The water may be recycled to the mister 506A, 506B via a pump 512. In one embodiment, a pump valve 522 may also control the flow of water to the pump 512 and to the pump line 524. A divider 526 separates the reservoir 510 from the water collection tank 514. The water may then exit through outlet 516, which may likewise be controlled via a valve 528. A water filter 530 may be used to ensure the water is potable. Air may exit the chamber 520 through exhaust 532. The air may be recycled to the fan 502 or may be exhausted to the atmosphere.

Accordingly, a method of generating water from the atmosphere comprises inducing air into a chamber, cooling the air and misting the air with water, and collecting the resulting water therefrom.

It will be appreciated from the foregoing that the atmospheric water generation apparatus disclosed herein solves the need for a water machine that can rapidly generate water from the atmosphere that remains potable.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. An atmospheric water generation apparatus, comprising:
    an intake fan for inducing air through a filter and into a housing intake, the housing intake leading to a chamber;
    at least one water mister within the chamber;
    a plate having a plurality of apertures, the apertures channeling the air to aid in direction and pressure to an evaporative coil, the evaporative coil for cooling the induced air and chamber;
    a water reservoir for collecting resulting water;
    a water outlet raised from a floor of the reservoir;
    a pump and a pump outlet on the floor of the reservoir for recycling water to the at least one water mister;
    a plumbing trap to prevent excess air pressure on the water outlet; and
    an air exhaust that directs exhausted air to the intake fan.

2. The atmospheric water generation apparatus of claim 1, further comprising a water collection tank segregated from the water reservoir.

3. The atmospheric water generation apparatus of claim 1, further comprising a shield over the water outlet.

4. An atmospheric water generation apparatus, comprising:
    a refrigeration unit;
    a galvanized housing within the refrigeration unit;
    a plurality of entry pipes passing through the refrigeration unit and the galvanized housing;
    a housing intake coupled to an exterior portion of the entry pipes;
    a fan coupled to the housing intake for inducing air into the entry pipes, the air passing through the entry pipes and cooling as a result of the refrigeration unit, the cooled air entering a chamber formed by the galvanized housing;
    at least one water mister for misting the cooled air as it enters the chamber;
    a water reservoir for collecting resulting water;
    a water outlet; and
    an air exhaust.

5. The atmospheric water generation apparatus of claim 4, further comprising an air filter.

6. The atmospheric water generation apparatus of claim 4, further comprising a water collection tank segregated from the water reservoir.

7. The atmospheric water generation apparatus of claim 4, further comprising a shield over the water outlet.

8. The atmospheric water generation apparatus of claim 4, further comprising a pump and a pump line for recycling water to the at least one water mister.

9. The atmospheric water generation apparatus of claim 4, further comprising a plumbing trap.

10. The atmospheric water generation apparatus of claim 4, wherein the air exhaust is recycled to the air intake fan.

* * * * *